United States Patent
Dueckinghaus et al.

(10) Patent No.: US 6,405,633 B1
(45) Date of Patent: Jun. 18, 2002

(54) HYDRAULIC PISTON-CYLINDER UNIT FOR AGRICULTURAL MACHINES

(75) Inventors: Heinrich Dueckinghaus, Bieldefeld; Dirk Schlichting, Paderborn-Dahl, both of (DE)

(73) Assignee: Caterpillar S.A.R.L., Geneva (CH)

( * ) Notice: Subject to any disclaimer, the term of this patent is extended or adjusted under 35 U.S.C. 154(b) by 0 days.

(21) Appl. No.: 09/778,426

(22) Filed: Feb. 7, 2001

(30) Foreign Application Priority Data

Feb. 16, 2000 (DE) .......................... 100 06 908

(51) Int. Cl.⁷ ................................ F15B 11/08
(52) U.S. Cl. ................ 91/436; 91/451; 91/467
(58) Field of Search ................... 91/436, 440, 451, 91/452, 467

(56) References Cited

U.S. PATENT DOCUMENTS

| | | | |
|---|---|---|---|
| 3,824,896 A | * 7/1974 | Tull, III .................. | 91/436 X |
| 4,391,571 A | * 7/1983 | Craggs .................... | 92/436 X |
| 4,610,193 A | * 9/1986 | Barker et al. ............ | 91/436 X |
| 4,909,331 A | 3/1990 | Defranco | |
| 5,313,873 A | * 5/1994 | Gall et al. ............... | 91/451 X |
| 5,415,076 A | * 5/1995 | Krone et al. ............ | 91/436 X |
| 5,826,486 A | * 10/1998 | Shimada .................. | 91/436 |
| 5,996,465 A | * 12/1999 | Morikawa et al. ...... | 91/436 X |

FOREIGN PATENT DOCUMENTS

EP  0 108 347 A1  10/1983

* cited by examiner

Primary Examiner—John E. Ryznic
(74) Attorney, Agent, or Firm—Diana L. Charlton

(57) ABSTRACT

The present invention is concerned with a work machine having a telescopic arm coupled to the front thereof. This arm is used for seating various sorts of frontal attachments and is raised and lowered by means of a hydraulic piston-cylinder unit. Now in order to ensure that an installed frontal attachment always rests on the ground with a pre-selected force, use is made of a pilot controlled seat valve and an adjustable pressure regulating valve which ensure that a constant pressure is maintained in the cylinder chamber formed below the base of the piston in the piston-cylinder unit when a constant supply of oil is fed to this part of the cylinder chamber. In consequence, this means that the installed frontal attachment always rests on the ground with one and the same force independently of whether the ground is flat or uneven. The frontal attachment thus precisely copies the contour of the ground at all times.

5 Claims, 3 Drawing Sheets

HYDRAULIC PISTON-CYLINDER UNIT FOR AGRICULTURAL MACHINES

TECHNICAL FIELD

This invention relates to a hydraulic piston-cylinder unit for work machines and, more particularly, to a cylinder chamber formed below the base of the piston and a cylinder chamber on a side of the piston that carries piston ring that are each connected via a respective line to a manually actuatable control valve which is coupled to an oil storage tank and an oil feed pump wherein a clamping valve is inserted in the line leading to the cylinder chamber formed below the base of the piston.

BACKGROUND ART

It is well known for a double action piston-cylinder unit to be used for raising and lowering an arm fitted t o the front of a self-propelled agricultural machine that is equipped with a device for seating a frontal attachment. Due to the use of a double action piston-cylinder unit, it follows that the frontal attachment can be driven upwardly or downwardly for pressing against the ground. It is not possible for the frontal attachment to oscillate of its own accord in the vertical direction. Therefore, during harvesting, an operator of an agricultural harvesting machine may be faced with the problem of making a particular frontal attachment, as a beet harvester, follow every unevenness in the ground whilst simultaneously ensuring that the frontal attachment rests on the earth with as constant a pressure as possible. To accomplish this task, the operator of the machine must exert maximum concentration even though the result will still be imperfect. To make it even more difficult, there is the additional problem that the actual position of the frontal attachment on the ground is very difficult to assess from the operator's viewpoint.

The present invention is directed to overcoming one or more of the problems as set forth above.

DISCLOSURE OF THE INVENTION

In an aspect of the present invention, a hydraulic piston-cylinder unit is disclosed. The piston-cylinder unit includes a cylinder chamber formed below a base of a piston and a cylinder chamber on a side of the piston carrying piston rings that are each connected via a respective line to a manually actuatable control valve which is coupled to an oil storage tank and an oil feed pump. A clamping valve is inserted in the line leading to the cylinder chamber formed below the base of the piston. The invention comprises a first line connectable between the control valve and the cylinder chamber formed below the base of the piston. A second line is connectable with the oil storage tank and is branched off from the first line connectable between the control valve and the cylinder chamber formed below the base of the piston. A pilot controlled seat valve and an adjustable pressure regulating valve are connected within the second line.

The present invention hydraulic double action piston-cylinder includes a pilot controlled seat valve and a pressure regulating valve that are located in a manner within a line connectable with an oil storage tank and branched off from a line connectable between a control valve and a cylinder chamber formed below a base of a piston to allow for a frontal attachment of a work machine to accurately copy the actual contour of the ground without involving too great a degree of concentration for an operator. At the same time, the present invention provides that the frontal attachment rests on the ground with the same amount of pre-selected force irrespective of the frontal attachment being used.

BEST MODE FOR CARRYING OUT THE INVENTION

Figure 1:
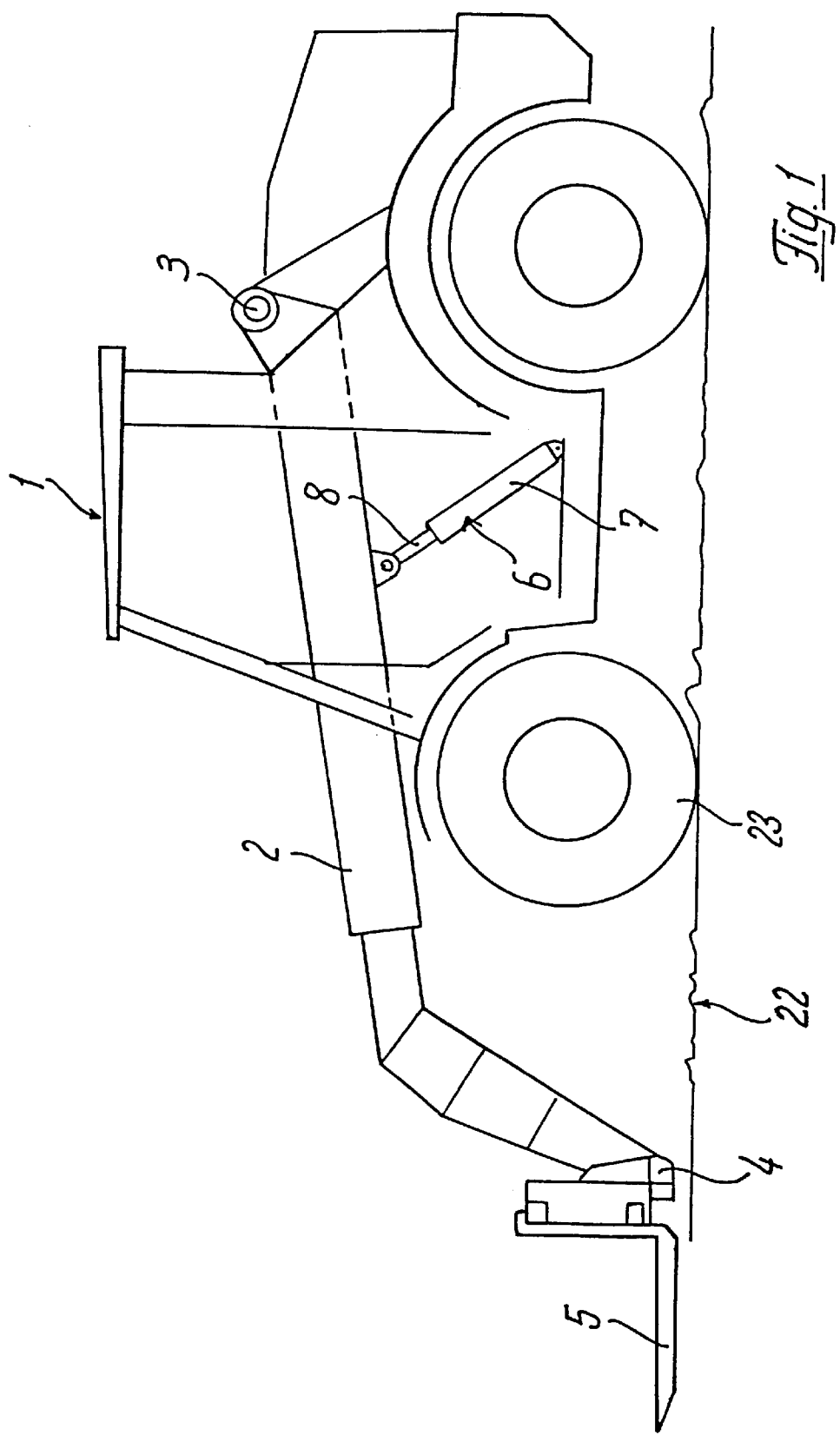
FIG. 1 shows a side view of the front part of a work machine including the present invention hydraulic piston-cylinder unit.
Figure 2:
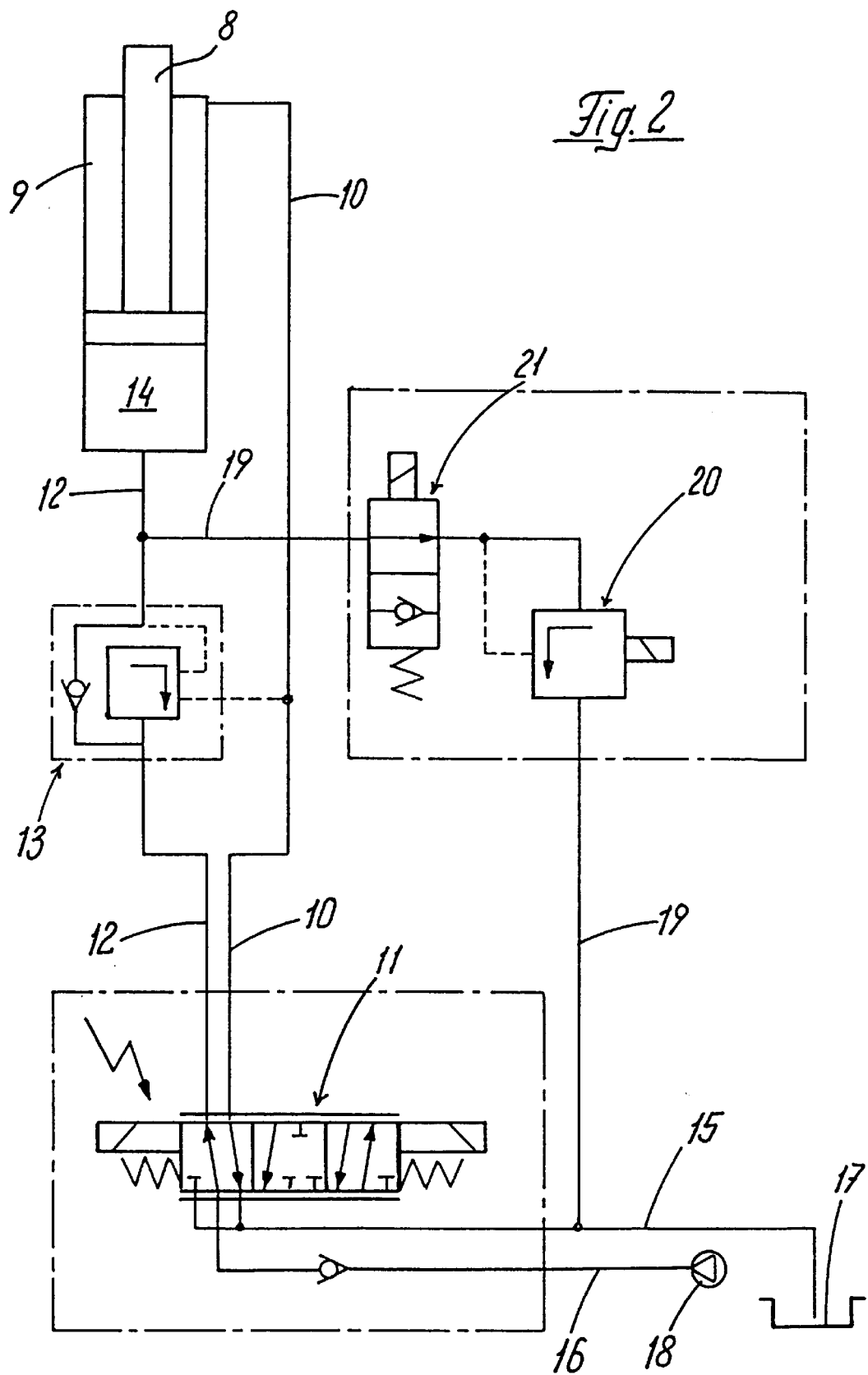
FIG. 2 is a connection diagram for controlling the hydraulic piston-cylinder unit as illustrated in FIG. 1.

Referring to FIGS. 1–2, a work machine 1 has a telescopic arm 2 pivotally mounted thereon about the axle 3. A plurality of wheels 23 are supported on the axle 3 for contact with the ground 22. A seating device 4, which is used for mounting frontal attachments 5 on the arm 2, is provided at the end of the telescopic arm 2 remote from the axle 3. In the exemplary embodiment illustrated here, the frontal attachment is a loading fork. The telescopic arm 2 is adapted to be raised and lowered by means of a piston-cylinder unit 6 that is controlled via an electro-hydraulic circuit. A cylinder 7 of this piston-cylinder unit 6 is connected to the work machine 1 and a piston rod 8 thereof is connected to the telescopic arm 2. A piston-ring-side cylinder chamber 9 is connected via a line 10 to a manually operable control valve 11 as is depicted in FIG. 2. A further line 12 leads from this control valve via a clamping valve 13 to a cylinder chamber 14 on the base side of the piston in the piston-cylinder unit 6. The control valve 11 is connected in known manner via further lines 15 and 16 to an oil storage tank 17 and an oil feed pump 18. A line 19, in which an adjustable pressure regulating valve 20 and a pilot controlled seat valve 21 are inserted, is branched off from the line 15 leading to the oil storage tank 17. The line 19 extends away from said pilot controlled seat valve 21 to the part of the line 12 located between the clamping valve 13 and the cylinder chamber 14 on the base side of the piston. As is illustrated in FIG. 1, the piston rod 8 of the hydraulic piston-cylinder unit 6 is articulated on the telescopic arm 2.

Figure 3:
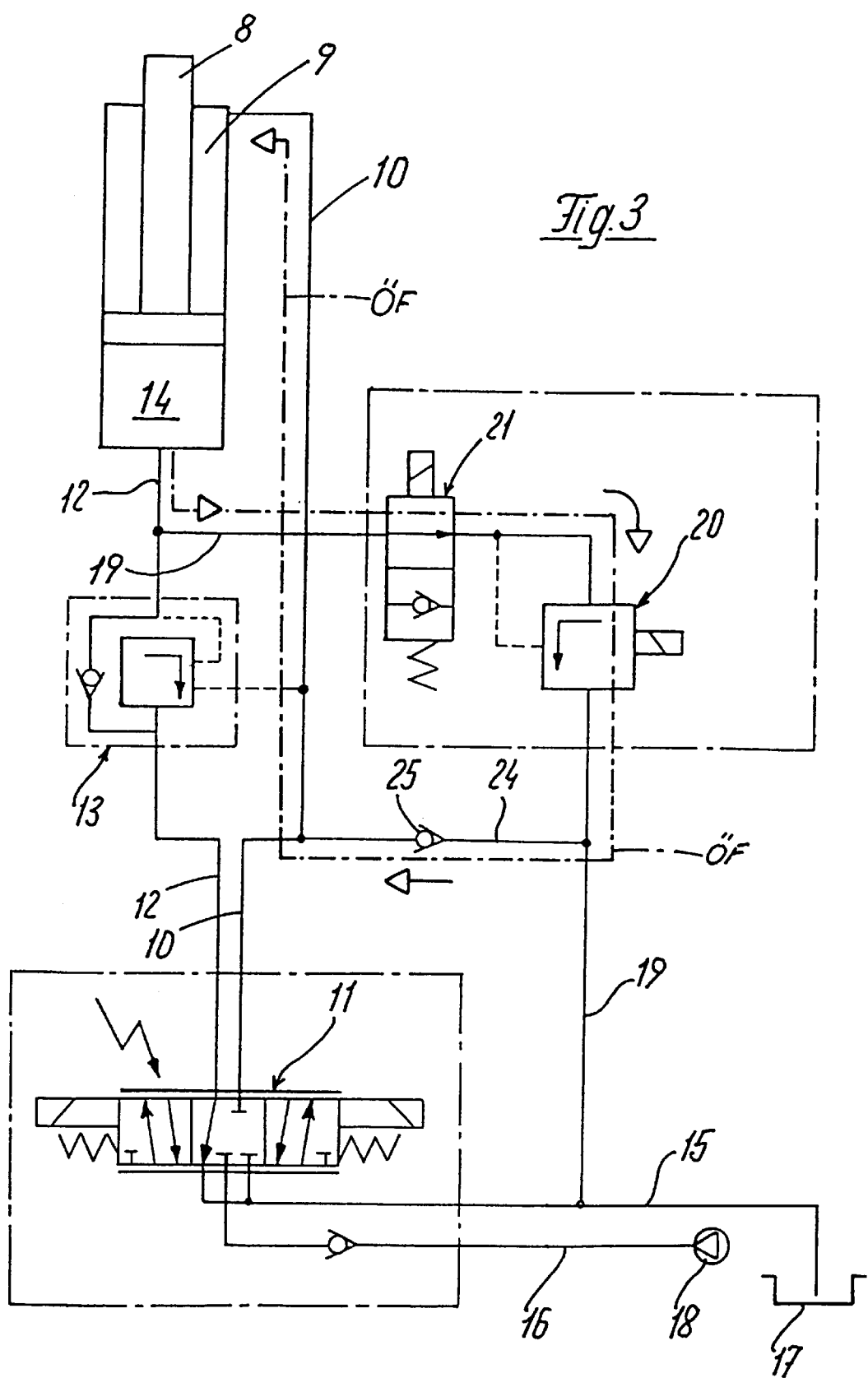
FIG. 3 is a modified form of the connection diagram illustrated in FIG. 2.

FIG. 3 differs from the connection diagram illustrated in FIG. 2 insofar as a line 24 incorporating a non-return valve 25 is branched off from the line 10 leading from the piston-ring-side cylinder chamber 9 to the control valve 11. This line 24 is coupled via the line 19 to the tank 17 and is also coupled to the piston side cylinder chamber 14 of the piston-cylinder unit 6 when the valve 21 is opened. The non-return valve 25 is arranged such as to prevent the oil from returning to the tank 17 from the piston-ring-side cylinder chamber 9. Should it be necessary to increase the speed at which the arm 2 falls, such as when a higher re-entry speed of the piston rod 8 is required, there is a short term, rapid exchange of oil between the cylinder chambers 9 and 14 via the lines 19, 24 and 10. The flow of oil being referred to here is denoted by dash-dotted lines in FIG. 3 and is referenced by öF. The excess quantity of oil coming from the cylinder chamber on the piston side is fed via the line 19 to the tank 17.

Industrial Applicability

Movement of the seat valve 21 to a blocked position, allows the piston rod 8 to be driven in and out with the aid of the control valve 11 whereby the arm 2 will be raised or lowered. Now in order to ensure that the loading fork 5 will always touch the ground 22 with the same amount of pressure independently of any unevenness thereof when mucking out stables, for example, the control valve 11 is set such that a constant quantity of oil will flow steadily into the cylinder chamber 14 on the base side of the piston (FIG. 2). The seat valve 21 is simultaneously moved to an unblocked position thereby allowing the adjustable pressure regulating valve 20 to ensure that one and the same pressure always prevails in said cylinder chamber 14. This means that the loading fork mounted on the telescopic arm 2 will always touch the ground 22 with one and the same pressure. Should the front wheels 23 of the work machine 1 fall into a hollow in the ground 22, a greater pressure will be exerted on the loading fork 5 by the ground 22. The effect of this is that the load on the piston rod 8 will be lessened so that it will be driven out by virtue of the steadily flowing quantity of oil and the pressure existing in said cylinder chamber 14 until such time as the pressure set by the pressure regulating valve 20 once more prevails in this cylinder chamber 14, thus preserving the wanted pressure of the loading fork 5 on the ground 22. By virtue of the present invention, the effect is also achieved that the same pressure will prevail in said cylinder chamber 14 under virtually all circumstances, thus representing a measure for the pressure with which the frontal attachment 5 rests on the ground 22.

Due to the use of the clamping valve 13, the speed at which the arm 2 can drop is dependent on the oil flow available to the piston-ring-side cylinder chamber 9. A high speed drop frequently cannot be achieved or can only be obtained at high revolutions of the diesel engine driving the oil feed pump 18 in the machine 1. In order to avoid this disadvantage, the line 24, leading directly to the oil storage tank 17 and having a non-return valve 25 inserted therein for preventing the oil from flowing back into the tank 17, is branched off from the line 10 extending between the control valve 11 and the piston-ring-side cylinder chamber 9 of the piston-cylinder unit 6. When the desired high speed lowering of the arm 2 is required, the oil is exchanged between the chambers on the piston and the piston ring sides, 14 & 9 respectively, whereby the superfluous oil is fed into the tank 17.

It should be understood that, in the event of particular circumstances, it may be necessary to connect the piston rod 8 to the work machine 1 rather than to the arm 2, and the cylinder 7 to the arm 2. Such a configuration would still fall within the scope of this invention and function in an analogous manner.

What is claimed is:

1. A hydraulic piston-cylinder-unit in which a cylinder chamber formed below a base of a piston and a cylinder chamber on a side of the piston carrying piston rings are each connected via a respective line to a manually actuatable control valve which is coupled to an oil storage tank and an oil feed pump, a clamping valve is inserted in the line leading to the cylinder chamber formed below the base of the piston, comprising:

a first line connectable between the control valve and the cylinder chamber formed below the base of the piston;

a second line connectable with the oil storage tank and being branched off from the first line connectable between the control valve and the cylinder chamber formed below the base of the piston;

a pilot controlled seat valve connected within the second line; and an adjustable pressure regulating valve connected within the second line.

2. The hydraulic piston-cylinder unit of claim 1, wherein when the pilot controlled seat valve is unblocked the control valve is set to provide a constant supply of oil to the cylinder chamber formed below the base of the piston.

3. The hydraulic piston-cylinder unit of claim 1, including a third line that leads to the oil storage tank with a non-return valve inserted therein for preventing the oil from flowing back into the oil storage tank, the third line being branched off from the line between the control valve and the cylinder chamber on the side of the piston carrying piston rings.

4. The hydraulic piston-cylinder unit of claim 1, wherein the hydraulic piston-cylinder unit is used for raising and lowering a telescopic arm fitted to the front of a wheeled agricultural machine.

5. The hydraulic piston-cylinder unit as claimed in claim 1, wherein the telescopic arm is equipped in known manner with a device for seating frontal attachments.

* * * * *